3,070,555
METHOD OF PREPARING ORGANOSILOXANE ELASTOMER FOAMS
Leonard B. Bruner, Jr., Midland, Mich., assignor to Dow Corning Corporation, Midland, Mich., a corporation of Michigan
No Drawing. Filed Apr. 20, 1959, Ser. No. 807,318
9 Claims. (Cl. 260—2.5)

This application relates to organosiloxane elastomer foams and a method of preparing them and is a continuation-in-part of copending application Serial No. 708,369, filed January 13, 1958, as a continuation-in-part of then copending application Serial No. 581,339, filed April 30, 1956, both of said previous applications being now abandoned.

In the art of preparing foams from organic and organosilicon materials two general methods are employed. One involves heating a mixture of a polymer and a blowing agent under conditions which cause the blowing agent to evolve gases or vapors in sufficient quantity to froth the polymer. Foams prepared by this method, both organic and organosilicon, are useful as insulation and other purposes but they require heating for the preparation thereof. Consequently this method is not applicable for applications which require foaming a resin under conditions where no artifical heat can be applied. Because of this, room temperature foams have been developed in the organic and organosilicon field. These involve mixing a combination of polymer and some reactive material which will evolve a gas at room temperature thereby causing the polymer to expand into a foam. In order for these foams to be satisfactory the polymer must, simultaneously with foaming, gel or set so that the foam does not collapse when the evolution of the gas has stopped.

Prior to this invention it was known (as can be seen from the copending application of Donald E. Weyer, Serial No. 516,739, filed June 20, 1955, now abandoned) that foams could be prepared from the organosilicon resins (that is organosilicon compounds having from 1 to 1.8 organic groups per silicon atom) by mixing an organosilicon resin and a hydroxyl containing compound with certain alkaline catalysts. It has been found that this combination produces excellent foams which are suitable for many commercial applications. However, since the polymers are resinous the resulting foams are rigid, non-elastic products. Consequently these foams are not suitable for use where an elastic material is needed.

Prior to this invention attempts have been made to prepare satisfactory room temperature foams from organosilicon rubbers. These previous attempts have failed due to the inability of preparing a material which would simultaneously foam and gel at room temperature. Consequently attempts were unsuccessful either due to the fact that the evolution of gas was not sufficient to cause proper foaming or else that the polymer would not get during foaming thus allowing the foam to collapse when evolution of gas had ceased.

Applicant has found that commercially feasible organosilicon rubber foams can be prepared at room temperature by employing the particular catalysts described hereinafter. It has been found that these catalysts give the required foaming and sufficiently rapid curing of the elastomer and do not deleteriously affect the thermal stability of the foamed product.

It is the primary object of this invention to provide a method of producing thermally stable siloxane elastomeric foams at room temperature. Another object is to provide elastic foams which are suitable for thermal insulation, for cushioning against mechanical shock and for damping. Other objects and advantages will be apparent from the following description.

In accordance with the method of this invention (1) a hydroxylated organopolysiloxane having a viscosity of at least 50 cs. at 25° C. and having on the average of from 1.9 to 2 monovalent hydrocarbon radicals, halogenated monovalent hydrocarbon radicals and hydrogen atoms per silicon atom, in said siloxane there being from 1 to 75% by weight based on the total weight of the siloxane of siloxane units containing at least one silicon-bonded hydrogen per silicon atom and said siloxane containing on the average at least 1.25 of the above-defined organic radicals per silicon atom, (2) up to 50 percent by weight based on the weight of the siloxane (1) of a hydroxylated compound and (3) from .1 to 10% by weight tin added as a stannous salt of a hydrocarbon-soluble carboxylic acid are mixed and thereafter allowed to foam to form an elastic product.

The principle upon which this invention works is believed to be the interaction of the silicon-bonded hydrogen with the hydroxyl groups to liberate hydrogen which causes the mixture to foam. Simultaneously there is an interaction of the silicon-bonded hydrogen with the hydroxyls in siloxane (1) to form silicon-oxygen cross links thereby curing the polymer to an elastomer. It has been found that these reactions occur at a sufficiently rapid rate in the presence of the specific catalysts of this invention, namely the stannous salts of carboxylic acids. With any other known type of catalyst one of three things prevents useable rubbers — either the hydrogen is not evolved at a sufficiently rapid rate to cause foaming or the setting of the siloxane is too slow to prevent collapse of the foam or the resulting siloxane foam is thermally unstable due to the deleterious effect of the catalyst.

Siloxane (1) employed in this invention can be either a colpolymer in which the SiH and SiOH appear in the same molecules or it can be a mixture of hydroxylated siloxane (a) and a SiH-containing siloxane (b). Regardless of whether (1) is a colpolymer of hydroxylated siloxanes and SiH-containing siloxanes or a mixture of of these two types of materials, the overall composition of (1) must be within the above-defined range.

If the amount of siloxane units having SiH linkages is less than 1% by weight of (1), insufficient foaming is obtained. If the amount of SiH is above 75% by weight, inferior elastomers are obtained. Preferably the amount of SiH-containing siloxane is from 2 to 75% by weight of the total weight of siloxane (1).

When siloxane (1) is a mixture of components (a) and (b), the hydroxylated portion (a) contains on the average from 1.9 to 2 monovalent hydrocarbon or halogenated monovalent hydrocarbon groups per silicon atom and has a minimum viscosity of 50 cs. There is no critical upper limit to the viscosity of (a), so that it can range in viscosity from relatively thin fluids to non-flowing gums. (a) can be either homopolymeric or copolymeric.

Siloxane component (b) must be present in the mixture in amount so that the total weight per cent of siloxane units having at least one H bonded to the silicon is from 1 to 75% by weight of the total weight of mixture (1). The viscosity of (b) is not critical and may range from materials of 1 to 2 cs. up to non-flowing gums. When (b) is a gum it is desirable to employ a solvent such as benzene, ether or the like in order to insure thorough mixing.

Siloxane (b) can be a completely condensed material such as cyclic siloxanes or triorganosilyl end blocked siloxanes or it may also contain SiOH groups. (b) can be homopolymeric or copolymeric, and those valences of the silicon which are not satisfied by H and O atoms are satisfied by monovalent hydrocarbon or halogenated monovalent hydrocarbon radicals. Preferably there is on the average at least 1 monovalent hydrocarbon or halogenated monovalent hydrocarbon radical per silicon atom.

Specific examples of copolymeric siloxanes which can be employed as siloxane (1) are 10 mol percent ethylhydrogensiloxane and 90 mol percent ethylmethylsiloxane; 25 mol percent $HSiO_{3/2}$, 25 mol percent dimethylsiloxane and 50 mol percent phenylmethylsiloxane; and 1 mol percent monophenylsiloxane, 5 mol percent $H_2SiO$, 4 mol percent octadecylmethylsiloxane and 90 mol percent dimethylsiloxane. All of these copolymers contain SiOH groups.

Specific examples of mixtures which can be employed as siloxane (1) are mixtures of a hydroxylated dimethylsiloxane and $(MeHSiO)_5$, mixtures of a hydroxylated copolymer of dimethylsiloxane and diphenylsiloxane and a copolymer of methylhydrogensiloxane and trimethylsiloxane and mixtures of a hydroxylated copolymer of monomethylsiloxane and dimethylsiloxane and a copolymer of methylhydrogensiloxane and dimethylhydrogensiloxane.

Siloxane (1), both mixtures and copolymers, can contain any of the following types of siloxane units: $RSiO_{3/2}$, $R_2SiO$, $R_3SiO_{1/2}$, RHSiO, $HSiO_{3/2}$, $RH_2SiO$, $H_2SiO$ and $SiO_2$. These various units must be in the proportions such that the ratio of organic radicals and hydrogen atoms to silicon will fall within the above-defined limits.

For the purpose of this invention the R groups on the silicon can be any monovalent hydrocarbon radical such as alkyl radicals such as methyl, ethyl, propyl or octadecyl; alkenyl radicals such as vinyl, allyl and hexenyl; cycloaliphatic radicals such as cyclohexyl, cyclopentyl and cyclohexenyl; aralkyl hydrocarbon radicals such as benzyl and aryl hydrocarbon radicals such as phenyl, tolyl, naphthyl and xenyl. The R groups can also be any halogenated monovalent hydrocarbon radical such as chlorophenyl, trifluorovinyl, chlorodifluorovinyl, trifluoropropyl, tetrafluoroethyl, bromoxenyl, $\alpha,\alpha,\alpha$-trifluorotolyl, tetrafluorocyclobutyl, chlorotrifluorocyclobutyl and heptafluoropentyl.

From the above description it can be seen that the hydroxyl groups and the silicon-bonded hydrogen can be located in any portion of the siloxane molecule. Thus, for example, the hydroxyl groups can be on the end of the siloxane chains or they can be along the chains or they can be located in both positions. The same is true of the silicon-bonded hydrogen atoms.

In the preferred embodiment of this invention the composition also contains a hydroxylated compound (2) in addition to hydroxylated siloxane (1). Preferably hydroxylated compound (2) is present in amount from 1 to 50% by weight based on the weight of siloxane (1). The function of this hydroxylated compound is to furnish excess hydroxyl groups for reaction with the silane hydrogen in order to produce sufficient gas to foam the composition. If desired, a mixture of two or more hydroxylated compound (2) can be employed.

For purposes of this invention any hydroxylated compound either organic or inorganic which is at least partially compatible with the siloxane system is operative. Thus hydroxylated compound (2) can be, for example, hydroxylated organosilicon compounds such as silanols, e.g. trimethylsilanol, triphenylsilanol, triethylsilanol and dimethylsilanediol and low molecular weight hydroxylated siloxanes such as sym-tetramethyldisiloxanediol, water; carboxylic acids such as formic, acetic, isobutyric, malonic, caprioc, succinic, benzoic, $\beta$-chloracrylic, acetoacetic, chloroacetic, acetonedicarboxylic, mercaptoacetic, bromomalonic, $\alpha$-cyanopropionic, succinamic and $\alpha$-hydroxy-o-toluic acids and $\beta$-alanine; and alcohols of less than twelve carbon atoms. These alcohols can be monohydric monofunctional alcohols such as ethanol, isopropanol, butanol, tertiary-butanol and cyclopenthanol; monohydric polyfunctional alcohols such as 2-aminoethanol, acetol, acetoin, 2,2,2-trichloro-1-ethoxyethanol, furfuryl alcohol, glycol monoacetate, $\alpha$-hydroxyisobutyronitrile, lactic acid, cyanic acid, 4-hydroxy-4-methyl-2-penthanone, 2-propyn-1-ol, isethionic acid, ildol, 4-chloroallyl alcohol, 2-nitro-1-butanol, 2-fluoroethanol, glycidol and hydracrylonitrile, polyhydric alcohols containing no other function such as ethylene glycol, propylene glycol, 1,6-hexanediol, glycerine, pentaerythriotol and glucose and polyhydric polyfunctional alcohol such as 2,2'-thiodiethanol, triethanolamine, diethylene glycol, pentaethylene glycol, 3-butene-1,2-diol, bromalhydrate, 1-thioglycerol, glycerol $\beta$-mononitrate, glycerol ether, allanturic acid, arabonic acid and 2-ethyl-2-nitro-1,3-propanediol.

It should be understood that the use of hydroxylated compound (2) is optional since foams can be obtained by merely employing a mixture of siloxane (1) and the catalyst. This is particularly true where siloxane (1) contains a relatively low viscosity hydroxylated fluid. However, it is preferred to employ at least 1% of hydroxylated compound (2) since this gives superior foams. Mutual solvents such as dioxane, ethers, benzene or the like may be used to disperse (2) in (1).

The catalysts which are essential in the method of this invention are stannous salts of any hydrocarbon-soluble carboxylic acids. These include, for example, stannous salts such as stannous isobutyrate, stannous oleate, stannous stearate, stannous linoleate, stannous naphthenates, stannous benzoate, stannous naphthoate, stannous laurate, stannous o-thymotate, stannous $\beta$-benzoyl-propionate, stannous crotonate, stannous tropate, stannous p-bromobenzoate, stannous palmitoleate, stannous cinnamate and the stannous salt of phenyl acetic acid. Carboxylic acids which are insoluble in hydrocarbon solvents form stannous salts which have proved to be unsatisfactory as catalysts in the method of this invention.

The catalysts of this invention should be employed in amounts such that there is present in the system from 0.1 to 10% by weight tin based on the weight of siloxane (1). The preferred stannous salts are the stannous salts of aliphatic monocarboxylic acids which contain from 4 to 20 inclusive carbon atoms and which are preferably free of functional groups other than the carboxyl group.

In carrying out the process of this invention the various ingredients can be mixed in any desired fashion. Thus, for example, one may mix all three ingredients simultaneously or one may mix a hydroxylated siloxane and a hydrogen containing siloxane to make up ingredient (1) and then dissolve the catalyst in hydroxylated compound (2) and thereafter mix the two mixtures. In fact, it is often desirable to mix the catalyst and hydroxylated compound (2) particularly in those cases where the catalyst is not particularly soluble in siloxane (1). Thus an alcohol soluble salt can be incorporated in the mixture quite readily by first dissolving it in an alcohol which serves as hydroxylated compound (2).

After the catalyst and siloxane (1) have been brought together foaming of the compositions of this invention begins in a very short time and is generally complete within 5 to 20 minutes. At the end of this time the siloxane elastomer has gelled so that a permanent elastomeric foam is obtained.

The density of the foams prepared by the method of this invention can vary from .5 lb. per cu. ft. upwards. In general the less dense foams are obtained under conditions which give the more rapid evolution of hydrogen coupled with conditions where gelation of the elastomer does not take place until a considerable degree of expansion has been obtained. Thus for the less dense foams it is desirable to use larger amounts of the SiH compound and/or larger amounts of the hydroxylated compound (2) than one would employ for the more dense foams. Also foams of lighter density can be obtained by gentle warming of the mixture during foaming. In fact it is often desirable but not essential that the mixtures be warmed during foaming particularly where extremely light and soft sponges are desired.

If desired, fillers may be incorporated in the elastomeric foams of this invention. Any desired filler may be employed although the preferred fillers are inorganic materials such as metal oxides such as titania, zinc oxide, ferric oxide and magnesium oxide; siliceous materials such as clay, diatomaceous earth, fume silicas, silica aerogels, and silica xerogels; ceramic materials such as powdered glass, asbestos, silicon, powdered metals such as powdered aluminum and carbon black. The fillers can be employed in any desired amount.

If desired, the compositions of this invention may contain other additives normally employed in silicone rubbers such as oxidation inhibitors, compression set additives, pigments and the like.

The compositions of this invention are particularly useful in thermal insulation where extremes of temperature are to be encountered. For example, they may be applied to incompletely fabricated articles which must subsequently be heated during the fabrication process. Thus, for example, the composition could be sprayed on the inside of an automobile body prior to application of the external enameled finish. The body can be subsequently enameled and then put through the enamel baking process without deteriorating the insulating foam on the inside of the body.

The following examples are illustrative of the best methods of practicing the invention only and should not be construed as limiting the invention which is properly delineated in the appended claims.

All parts are parts by weight unless other specified.

Example 1

100 parts of a 2,600 cs. hydroxylated dimethylpolysiloxane fluid, 20 parts by weight of a 20 cs. low molecular weight hydroxylated dimethylpolysiloxane fluid, 5 parts of a trimethylsiloxy end-blocked methylhydrogenpolysiloxane of 23 cs. viscosity and 50 parts diatomaceous earth were mixed until a uniform mix was obtained. 3 parts by weight stannous 2-ethylhexoate was then stirred into the mixture. Foaming began almost at once and after 10 to 15 minutes an elastomeric foam having a density of about .5 g. per cc. was obtained.

Example 2

100 parts of a non-flowing hydroxylated dimethylsiloxane gum, 100 parts of a trimethylsiloxy end-blocked methylhydrogenpolysiloxane of about 20 cs. viscosity, 100 parts of tertiary-butanol and 6 parts of stannous 2-ethylhexoate were thoroughly mixed. The mixture was heated at 75° C. for 3 hours producing an extremely light rubber sponge. This sponge was then heated at 200° C. for 16 hours and was essentially unchanged.

Example 3

100 parts of a hydroxylated copolymer gum having the composition 7.5 mol percent phenylmethylsiloxane and 92.5 mol percent dimethylsiloxane, 5 parts of (MeHSiO)$_5$, 20 parts of a 30 cs. hydroxylated dimethylsiloxane fluid, .4 part of stannous 2-ethylhexoate were mixed and thereafter heated at 75° C. A foam formed in a short time which had a density of .29 g. per cc.

Example 4

100 parts of a 4950 cs. hydroxylated dimethylpolysiloxane fluid, 12 parts of a phenylhydrogenpolysiloxane having a viscosity of 645 cs., 5 parts of ethanol and 2 parts of stannous 2-ethylhexoate were mixed. An excellent foam was formed in a few minutes at room temperature.

Example 5

Equivalent results to those of Example 4 were obtained when stannous naphthenate and stannous oleate were substituted in the composition of Example 4.

Example 6

Foams were obtained when isopropanol, methanol, aqueous ethanol and propylene glycol were substituted for the ethanol of Example 4.

Example 7

100 parts of a 4650 cs. hydroxylated dimethylpolysiloxane fluid, 10 parts of a trimethyl siloxy end-blocked methylhydrogenpolysiloxane of about 20 cs. viscosity, 7 parts of ethanol and 25 parts of diatomaceous earth were mixed to obtain a uniform mixture. 2 parts of stannous 2-ethylhexoate were then stirred into the mixture which was allowed to stand at room temperature. A siloxane elastomer foam resulted which had a density of .2 g. per cc. The foam was heated 28 days at 250° C. at the end of which time it was still resilient and flexible.

Example 8

100 parts of a 2,000 cs. hydroxylated copolymer having the composition 10 mol percent methylhydrogen-siloxane and 90 mol percent dimethylsiloxane was mixed with 25 parts diatomaceous earth. 6 parts of stannous 2-ethylhexoate was dissolved in 5 parts absolute ethanol. The alcohol solution was then added to the siloxane filler mixture whereupon a foam was formed at room temperature. After 20 minutes the foaming was complete and a tough, flexible material was obtained.

Example 9

Equivalent results are obtained when the following hydroxylated siloxanes having a viscosity of 10,000 cs. are substituted for the siloxane of Example 1:

A copolymer of 5 mol percent methylvinylsiloxane and 95 mol percent dimethylsiloxane units Ethylmethylpolysiloxane A copolymer of 50 mol percent of tetrafluorocyclobutylmethylsiloxane and 50 mol percent dimethylsiloxane units A copolymer of 95 mol percent dimethylsiloxane and 5 mol percent monomethylsiloxane units A copolymer of 89 mol percent dimethylsiloxane, 1 mol percent octadecylmethylsiloxane and 10 mol percent diphenylsiloxane units A copolymer of 90 mol percent 3,3,3-trifluoropropylmethylsiloxane and 10 mol percent dimethylsiloxane units.

Example 10

An elastomeric foam is obtained when 100 parts of a 5,000 cs. hydroxylated dimethylpolysiloxane fluid, 20 parts by weight of a 3,000 cs. copolymer of 90 mol percent dimethylsiloxane and 10 mol percent $HSiO_{3/2}$, 20 parts of ethanol and 50 parts of diatomaceous earth are mixed and to the mixture is added 3 parts of stannous 2-ethylhexoate.

Example 11

100 parts by weight of an 8,000 cs. hydroxylated dimethylpolysiloxane fluid, 10 parts by weight of a trimethyl siloxy end-blocked methylhydrogensiloxane of about 20 cs. viscosity, 20 parts by weight of 2,4,4-trimethyl caproic acid and 25 parts diatomaceous earth were throughly mixed. 3 parts by weight of stannous 2-ethylhexoate were then mixed with the composition and a tough, resilient elastomeric foam resulted.

A foam was also obtained when 5 parts by weight of acetic acid was substituted for the caproic acid above.

Example 12

100 parts by weight of a 2600 cs. hydroxylated dimethylpolysiloxane fluid, 10 parts by weight of a 50 cs. hydroxyl-endblocked dimethylpolysiloxane fluid, 5 parts by weight of diphenylmethylsilanol, 8 parts by weight of a trimethylsiloxy-endblocked methylhydrogenpolysiloxane of 23 cs. viscosity, 20 parts by weight of diatomaceous earth, 5 parts by weight of iron oxide and 6 parts by weight of stannous octoate were mixed. An excellent foam was formed in a few minutes at room temperature.

*Example 13*

100 parts by weight of a 50 cs. hydroxyl-endblocked dimethylpolysiloxane fluid, 5 parts by weight of diphenylmethylsilanol, 8 parts by weight of a trimethylsiloxy-endblocked methylhydrogenpolysiloxane of 23 cs. viscosity, 20 parts by weight of diatomaceous earth, 5 parts by weight of iron oxide and 12 parts by weight of stannous octoate were mixed and allowed to stand at room temperature. An elastomeric foam resulted.

*Example 14*

Equivalent foams are formed when 10 parts by weight of the following alcohols are substituted for the 20 cs. hydroxylated dimethylpolysiloxane fluid in the procedure of Example 1:

Triethyleneglycol
Glycerine
Pentaerythritol
Glucose
α-Hydroxyisobutyronitrile
2-nitrobutanol
β-Chloroethanol
Ethanolamine
Glycolmonoacetate That which is claimed is:

1. A method of preparing a siloxane elastomeric foam which comprises mixing (1) an organopolysiloxane containing silicon-bonded OH groups and having a viscosity of at least 50 cs. at 25° C. and having per silicon atom on the average from 1.9 to 2 radicals of the group consisting of monovalent hydrocarbon radicals, halogenated monovalent hydrocarbon radicals and hydrogen atoms, in said siloxane there being from 1 to 75% by weight siloxane units containing at least one silicon-bonded hydrogen atom and said siloxane containing an average of at least 1.25 total monovalent hydrocarbon radicals and halogenated monovalent hydrocarbon radicals per silicon atom, (2) up to 50% by weight based on the weight of siloxane (1) of a hydroxylated compound selected from the group consisting of silanols, low molecular weight hydroxylated siloxanes, water, carboxylic acids and alcohols of less than twelve carbon atoms, and (3) a stannous salt of a hydrocarbon-soluble monocarboxylic acid in amount sufficient to give from .1 to 10% by weight tin based on the weight of siloxane (1) and thereafter allowing the mixture to foam.

2. The method of claim 1 wherein the organic radicals in siloxane (1) are methyl radicals and wherein the catalyst (3) is stannous octoate.

3. The method of claim 1 wherein some of the organic radicals in siloxane (1) are phenyl radicals, the remainder of said organic radicals being methyl radicals, and wherein the catalyst (3) is stannous octoate.

4. A method of preparing a siloxane elastomeric foam which comprises mixing (1) a mixture of (a) an organopolysiloxane containing silicon-bonded OH groups and having a viscosity of at least 50 cs. at 25° C. and having an average of from 1.9 to 2 monovalent hydrocarbon radicals per silicon atom and (b) a siloxane containing silicon-bonded hydrogen in amount such that there is from 1 to 75% by weight based on the weight of (a) of siloxane units containing at least one silicon-bonded hydrogen atom, the remaining groups attached to the silicon in (b) being organic radicals selected from the group consisting of monovalent hydrocarbon radicals and halogenated monovalent hydrocarbon radicals, (2) from 1 to 50% by weight based on the weight of (1) of a hydroxylated compound selected from the group consisting of silanols, low molecular weight hydroxylated siloxanes, water, carboxylic acids and alcohols of less than twelve carbon atoms, and (3) a stannous salt of a hydrocarbon-soluble monocarboxylic acid in amount sufficient to give from .1 to 10% by weight tin based on the weight of siloxane (1) and thereafter allowing the mixture to foam.

5. The method of claim 4 in which all of the organic radicals in siloxane mixture (1) are methyl radicals and wherein the catalyst (3) is stannous octoate.

6. The method of claim 4 wherein some of the organic radicals in siloxane mixture (1) are phenyl radicals, the remainder of said organic radicals being methyl radicals, and wherein the catalyst (3) is stannous octoate.

7. The method of claim 1 wherein some of the organic radicals in siloxane (1) are trifluoropropyl radicals, the remainder of said organic radicals being methyl radicals, and wherein the catalyst (3) is stannous octoate.

8. The method of claim 9 wherein some of the organic radicals in siloxane mixture (1) are trifluoropropyl radicals, the remainder of said organic radicals being methyl radicals, and wherein the catalyst (3) is stannous octoate.

9. A method of preparing a siloxane elastomeric foam which comprises mixing (1) a mixture of (a) an organopolysiloxane containing silicon-bonded OH groups and having a viscosity of at least 50 cs. at 25° C. and having an average of from 1.9 to 2 total monovalent hydrocarbon radicals and halogenated monovalent hydrocarbon radicals per silicon atom and (b) a siloxane containing silicon-bonded hydrogen in amount such that there is from 1 to 75% by weight based on the weight of (a) of siloxane units containing at least one silicon-bonded hydrogen atom, the remaining groups attached to the silicon in (b) being organic radicals selected from the group consisting of monovalent hydrocarbon radicals and halogenated monovalent hydrocarbon radicals, (2) from 1 to 50% by weight based on the weight of (1) of a hydroxylated compound selected from the group consisting of silanols, low molecular weight hydroxylated siloxanes, water, carboxylic acids and alcohols of less than twelve carbon atoms, and (3) a stannous salt of a hydrocarbon-soluble monocarboxylic acid in amount sufficient to give from .1 to 10% by weight tin based on the weight of siloxane (1) and thereafter allowing the mixture to foam.

References Cited in the file of this patent

UNITED STATES PATENTS

| 2,449,572 | Welsh | Sept. 21, 1948 |
| 2,803,614 | Solomon | Aug. 20, 1957 |
| 2,833,732 | Weyer | May 6, 1958 |

FOREIGN PATENTS

| 798,669 | Great Britain | July 23, 1958 |
| 809,497 | Great Britain | Feb. 25, 1959 |

UNITED STATES PATENT OFFICE
CERTIFICATE OF CORRECTION

Patent No. 3,070,555

December 25, 1962

Leonard B. Bruner, Jr.

It is hereby certified that error appears in the above numbered patent requiring correction and that the said Letters Patent should read as corrected below.

Column 4, line 30, for "tropate" read -- atropate --; column 6, line 8, for "trimethyl seloxy" read -- trimethylsiloxy --.

Signed and sealed this 3rd day of December 1963.

(SEAL)
Attest:
ERNEST W. SWIDER

Attesting Officer

EDWIN L. REYNOLDS

Acting Commissioner of Patents